May 12, 1925.

D. C. DAVIS 1,537,069

AUTOSTOP MECHANISM

Filed Aug. 29, 1921

David C Davis
INVENTOR

Patented May 12, 1925.

1,537,069

UNITED STATES PATENT OFFICE.

DAVID C. DAVIS, OF CHESTER, PENNSYLVANIA, ASSIGNOR TO WESTINGHOUSE ELECTRIC AND MANUFACTURING COMPANY, A CORPORATION OF PENNSYLVANIA.

AUTOSTOP MECHANISM.

Application filed August 29, 1921. Serial No. 496,546.

*To all whom it may concern:*

Be it known that I, DAVID C. DAVIS, a citizen of the United States, and a resident of Chester, in the county of Delaware and State of Pennsylvania, have invented a new and useful Improvement in Autostop Mechanism, of which the following is a specification.

My invention relates to a safety and alarm system for lubricating systems and has for its object to provide apparatus of the character designated which shall effectually warn the operator in case the oil circulation stops in a lubricating system; and it may further serve to stop machinery with which said lubricating machinery is associated, in case the oil circulation fails.

A further object is to provide a method and apparatus for effectually removing conducting particles, such as metal or carbon, from the oil of a circulating system.

Figure 1:
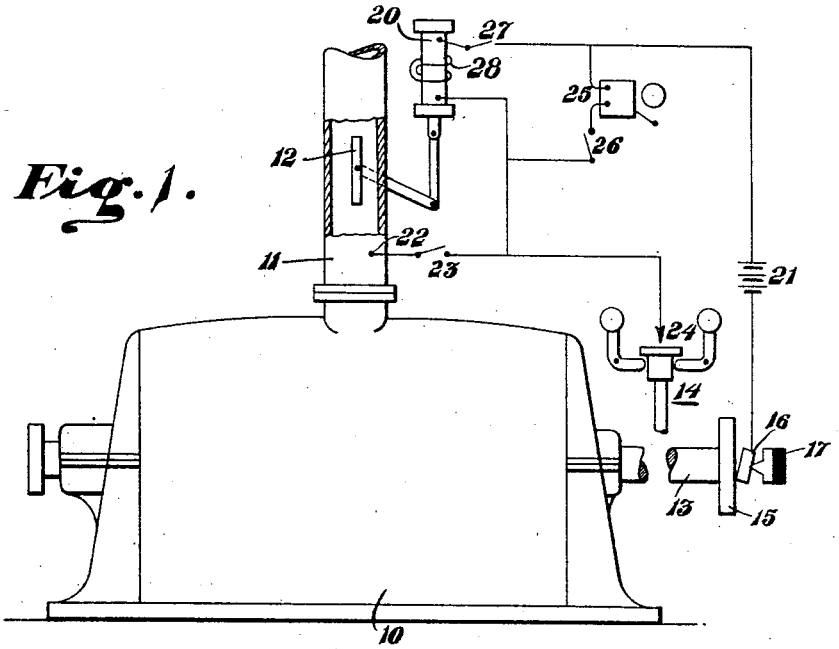
Figure 2:
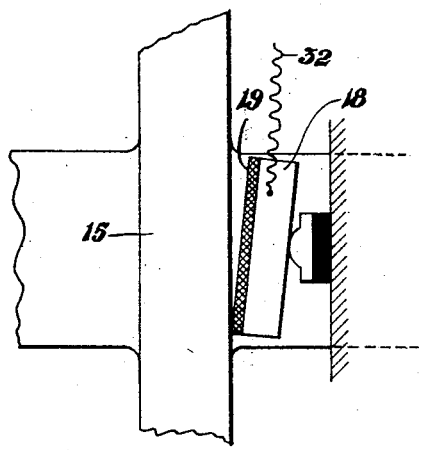
Figure 3:
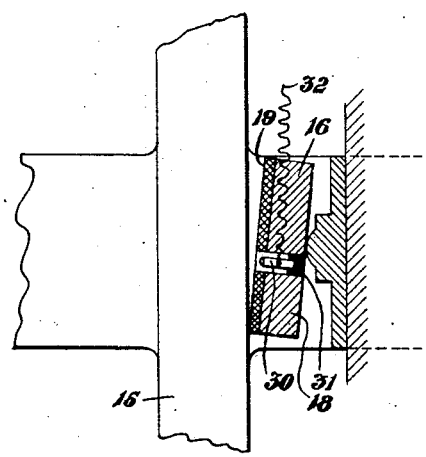

In the accompanying drawing, Figure 1 is a diagrammatic view of a steam turbine provided with a thrust bearing of the tilting-shoe type and with other appropriate elements, illustrating a preferred form of my invention; Figure 2 is an enlarged view of a portion of the thrust bearing shown in Figure 1, illustrating details of my invention; and Figure 3 is a view similar to Figure 2 and illustrating a modification in the structure thereof.

It is the usual practice to lubricate large heavy-duty bearings such, for example, as the shaft bearings and thrust bearings of steam turbines, by means of a forced oil circulation and it is essential that this oil circulation be continuous, inasmuch as the operation of the bearings for a very short period of time, in the absence of oil, causes serious injury thereto. In particular, it is necessary that the lubrication of the thrust bearing of a turbine be maintained, inasmuch as the failure of the bearing, upon the cessation of oil flow, frequently permits such endwise movement of the spindle as to seriously damage the blading.

My invention relates, in its essence, to making use of the insulating property of the ordinary oil film in maintaining an electrical circuit in open condition, the failure of the oil film, upon the cessation of oil flow, permitting contact between the normally separated bearing surfaces, with the ringing of an alarm bell or the blowing of a whistle, and, if desired, with the automatic shutting down of the turbine or other apparatus with which the bearing may be associated.

My invention is of particular adaptability in connection with bearings of the Kingsbury or tilting-shoe type in which a wedge-shaped film of material thickness is at all times maintained between the bearing surfaces under normal operation, and in which metallic contact is immediately established upon the failure of the oil supply.

Another feature of my invention is that inasmuch as the oil is constantly passing between spaced conducting surfaces, between which a difference of potential is maintained, a minute arc is established upon the passage of a conducting particle and said particle is destroyed by vaporization, thus tending to maintain the purity of the oil supply.

Referring to the drawing for a more detailed understanding of my invention, I show a turbine at 10, in Figure 1 provided with a steam supply 11, having a throttle valve 12 therein.

The shaft of the turbine 10 is shown at 13, this shaft driving a governor 14, of the usual form, and also carrying a thrust collar 15 adapted to bear against a thrust bearing of the Kingsbury or tilting-shoe type, as indicated at 16. The shoe 16 is preferably insulated, as shown at 17 in Figures 1 and 2 and, furthermore, is preferably formed with a relatively hard metal-backing portion 18, as of brass or iron and a soft metal face 19 formed, for example, of Babbitt metal.

A solenoid or other electromotor device 20 is provided for the closure of the valve 12 and is in circuit with the shoe 16 and with an electromotive source 21, the other terminal thereof being grounded as at 22 through a switch 23 and the thrust collar 15 being grounded by virtue of its connections to the machine.

A contact point 24 is provided adjacent the governor so as to make contact with a portion thereof when the governor is in its normal full-speed position, thus automatically establishing a ground connection with the lower terminal of the solenoid 20.

An alarm device 25, together with a switch 26 therefor, is connected in shunt relation to the device 20 and the device 20 may be removed from circuit, as by opening a switch 27.

The solenoid 20 is shown as of the sluggish or slow-moving type, as indicated by a damping winding 28, for a purpose to be hereinafter more fully explained.

Having thus described the structure of apparatus constructed in accordance with my invention, the operation thereof is as follows:—

Upon putting the turbine into service, the rotation of the oil pump at once supplies oil to the thrust bearing and an oil film is established between the thrust collar 15 and the shoe 16, this film effectively insulating these two members from each other. Upon the closure of the switches 23 and 27, the device 20 is in circuit with the current source 21, the circuit being broken only at the oil film. Upon the failure of the oil supply or when, for any reason, the film is destroyed, the collar 15 makes contact with the shoe 16 and the circuit is closed, energizing the device 20 and cutting off the steam supply at the valve 12; and at the same time the alarm device 25 is rung, provided the switch 26 is closed. The full speed operation of the turbine causes the governor 14 to assume its high speed position, under which circumstances, contact is made with the contact member 24 and thus a ground is automatically established, even if the switch 23 is not closed.

Small conducting particles, such as carbon or metal, passing between the collar 15 and the shoe 16 tend to destroy the insulating qualities of the oil film at a small point but a minute arc is at once established, vaporizing such conducting particles. By placing the damping winding 28 on the coil 20, the coil is made sluggish in action and does not respond to the current flow in these minute arcs so as to cut off the steam in response thereto, although the device 20 is still operative in full degree to close the valve 12 upon the establishment of a long-continued closure of the circuit between the elements 15 and 16.

Referring to the form of my device shown in Figure 3, the thrust collar 15 is opposed by the tilting shoe 16, having a hard metal backing 18 and a soft metal face 19, all as hitherto, except that an opening is provided through the shoe at a substantially central portion thereof and a conducting pin 30 is mounted in this opening so as to terminate just short of the bearing face of the portion 19. The pin 30 is insulated, as at 31, and is connected in circuit as before, through a wire 32.

During normal operation, the circuit is not closed, inasmuch as the pin 30 does not come into contact with the collar 15, but upon the failure of the oil supply, the soft metal face 19 is rapidly fused and the pin 30 is grounded, either by having molten metal from the face 19 come in contact therewith or by bearing directly against the thrust collar 15. In either event, a circuit is closed through the wire 32 and the turbine is shut down or an alarm device rung as previously described.

While I have shown my invention in combination with a turbine, it will be obvious that it is equally susceptible of application in connection with any type of machinery wherewith bearings are employed and which, during normal operation, embody an oil film of material thickness. While I have illustrated but one tilting shoe in each of the bearings shown, it is well understood in the art that a series of such shoes is mounted, facing the thrust collar, and my invention may be applied to one or more of such shoes, as desired.

While I have shown my invention in two forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. The combination with a bearing structure embodying an oil film, of an electric circuit including a translating device, and means depending upon the insulating properties of said film for modifying said circuit.

2. The combination with a bearing structure embodying an oil film, of an electric circuit including a translating device, and means whereby said circuit is normally open by virtue of the insulating properties of said film and whereby said circuit is closed, upon the failure of said oil film, for the energization of said translating device.

3. The combination with a bearing of the tilting-shoe type, wherein, in normal operation, a wedge-shaped oil film is maintained between the bearing surfaces, of insulating means for at least one of said surfaces, and an electric circuit including a translating device and said bearing surfaces, whereby, upon the failure of said oil film and the consequent contacting of the bearing faces, said circuit is closed and said translating device is energized.

4. The combination with a driving device, of a bearing structure associated therewith and normally embodying an oil film, a de-energizing device for said driving device, and an electric circuit including said de-energizing device and said oil film, whereby, during normal operation, said circuit is maintained broken by the insulation afforded by said film and is closed by the failure of said film for the operation of said de-energizing device and the stoppage of said driving device.

5. The combination with a driving device, of a bearing structure of the tilting-shoe type associated therewith and normally embodying a wedge-shaped oil film of substantial thickness, a de-energizing device for said driving device, and an electric circuit including said de-energizing device and said oil film, whereby, during normal operation, said circuit is maintained broken by the insulation afforded by said film and is closed by the failure of said film for the operation of said de-energizing device and the stoppage of said driving device.

In testimony whereof, I have hereunto subscribed my name this 24th day of August, 1921.

DAVID C. DAVIS.